(12) United States Patent
Brooks

(10) Patent No.: US 10,121,407 B2
(45) Date of Patent: Nov. 6, 2018

(54) SYSTEMS AND METHODS FOR PROVIDING REDUNDANT DATA AND POWER

(71) Applicant: Anthem Displays, LLC, Boulder, CO (US)

(72) Inventor: Evan Brooks, Boulder, CO (US)

(73) Assignee: Anthem Displays, LLC, Boulder, CO (US)

( * ) Notice: Subject to any disclaimer, the term of this patent is extended or adjusted under 35 U.S.C. 154(b) by 0 days.

(21) Appl. No.: 15/610,309

(22) Filed: May 31, 2017

(65) Prior Publication Data

US 2017/0345363 A1      Nov. 30, 2017

Related U.S. Application Data

(60) Provisional application No. 62/343,668, filed on May 31, 2016.

(51) Int. Cl.
| | |
|---|---|
| G05F 1/00 | (2006.01) |
| G09G 3/32 | (2016.01) |
| G06F 3/14 | (2006.01) |
| G09F 9/302 | (2006.01) |

(52) U.S. Cl.
CPC .............. G09G 3/32 (2013.01); G06F 3/1446 (2013.01); *G09F 9/3026* (2013.01); *G09G 2300/026* (2013.01); *G09G 2330/02* (2013.01); *G09G 2330/08* (2013.01); *G09G 2330/12* (2013.01)

(58) Field of Classification Search
CPC .. G06F 3/1446; G09G 3/32; G09G 2300/026; G09G 2330/02
See application file for complete search history.

(56) References Cited

U.S. PATENT DOCUMENTS

| | | | |
|---|---|---|---|
| 7,355,562 B2* | 4/2008 | Schubert | G09F 9/33 345/1.3 |
| 7,502,950 B1* | 3/2009 | Brands | G06F 3/1446 323/234 |
| 7,884,553 B2* | 2/2011 | Wada | H05B 33/0827 315/185 R |
| 8,207,933 B2* | 6/2012 | Shin | G09G 3/3413 315/169.3 |
| 8,599,108 B2* | 12/2013 | Kline | G09F 9/33 345/1.1 |

(Continued)

OTHER PUBLICATIONS

International Search Report and Written Opinion for International (PCT) Patent Application No. PCT/US17/35245, dated Oct. 18, 2017 9 pages.

*Primary Examiner* — Alexander H Taningco
*Assistant Examiner* — Kurtis R Bahr
(74) *Attorney, Agent, or Firm* — Sheridan Ross P.C.

(57) ABSTRACT

A display system including a plurality of light-emitting diode (LED) display modules is provided. Each LED display module of the plurality of display modules may include a plurality of LEDs. The display system may also include a plurality of connection hubs, where each connection hub of the plurality of connection hubs is configured to provide power to two or more LED display modules of the plurality of LED display modules. One or more of the LED display modules of the plurality of LED display modules may be configured to selectively route the power provided by a connection hub of the plurality of connection hubs to an LED display module that is adjacent to the one or more LED display modules.

18 Claims, 15 Drawing Sheets

(56) References Cited

U.S. PATENT DOCUMENTS

| | | | | |
|---|---|---|---|---|
| 8,901,829 | B2* | 12/2014 | van de Ven | H05B 33/083 |
| | | | | 315/152 |
| 8,922,458 | B2* | 12/2014 | Sefton | G06F 3/1446 |
| | | | | 345/1.1 |
| 9,047,791 | B2* | 6/2015 | Cox | G09F 27/008 |
| 9,311,847 | B2* | 4/2016 | Hall | G09G 3/3208 |
| 9,468,059 | B2* | 10/2016 | Hong | H05B 33/083 |
| 9,686,833 | B2* | 6/2017 | Bong | H05B 33/0845 |
| 2003/0223210 | A1* | 12/2003 | Chin | H05K 3/0052 |
| | | | | 361/806 |
| 2009/0128461 | A1* | 5/2009 | Geldard | G06F 3/1446 |
| | | | | 345/84 |
| 2009/0146931 | A1 | 6/2009 | Kharrati et al. | |
| 2009/0312884 | A1* | 12/2009 | Li | G06F 3/1446 |
| | | | | 700/295 |
| 2011/0181495 | A1* | 7/2011 | Chu | G09F 9/33 |
| | | | | 345/1.3 |
| 2015/0173133 | A1* | 6/2015 | Seki | H05B 33/0818 |
| | | | | 315/185 R |
| 2016/0132283 | A1 | 5/2016 | Hall | |

* cited by examiner

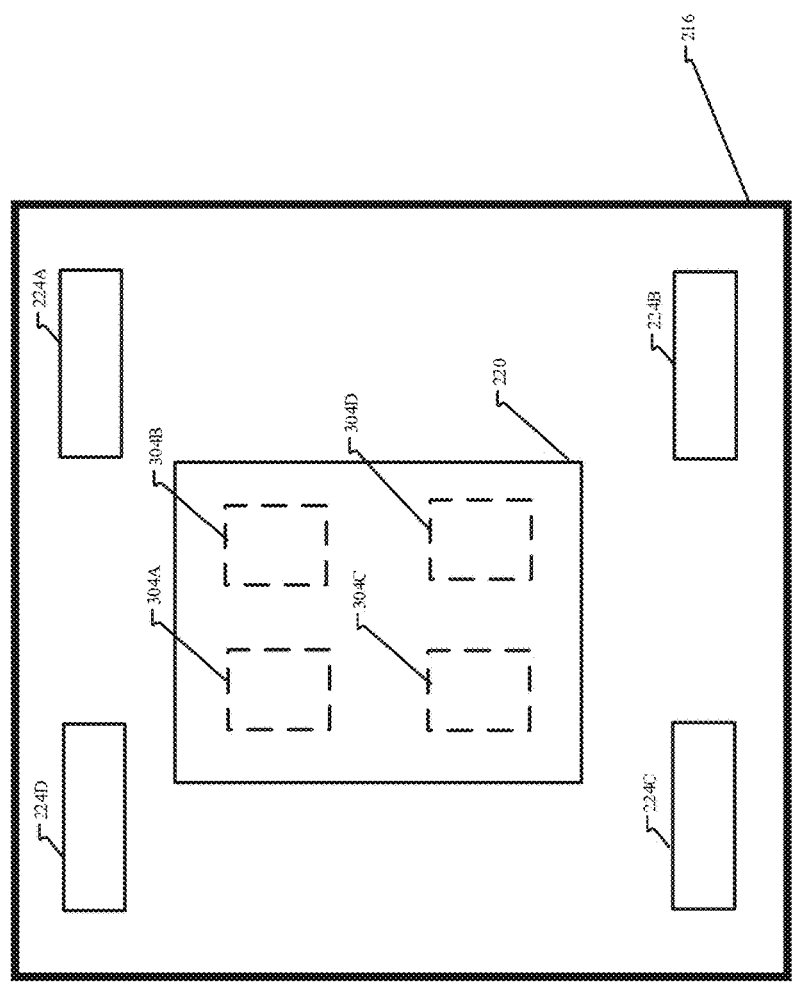

SYSTEMS AND METHODS FOR PROVIDING REDUNDANT DATA AND POWER

CROSS REFERENCE TO RELATED APPLICATIONS

This application claims the benefit of U.S. Provisional Patent Application Ser. No. 62/343,668, filed May 31, 2016, the entire disclosure of which is hereby incorporated herein by reference for all that it teaches and for all purposes.

FIELD OF THE INVENTION

The disclosure relates to systems and methods for providing power and/or data to one or more light-emitting diode (LED) display modules of a display.

BACKGROUND

Light-emitting diode (LED) display modules generally include a plurality of pixels, such that when a plurality of LED display modules is arranged together in a panel for example, a larger LED display may be formed. In some instances, power supplied to one or more of the LED display modules may be interrupted thereby degrading the display in some manner.

SUMMARY

In accordance with embodiments of the present disclosure, electronic components and an interconnection schema that provides redundant data and power paths is provided. Such components and interconnection schema result in reliable display image integrity that is resilient to individual component failures, and at the same time reduces the number of components and cables in the display relative to conventional power supplies and conventional interconnection schemas.

In accordance with embodiments of the present disclosure, light-emitting diode (LED) modules having two connector ports are described. Such connector ports are capable of relaying data from port to port. Moreover, such ports may be capable of switching on a pathway for power to flow from one port to the other port through the LED display module.

In accordance with embodiments of the present disclosure, a single connection hub may be provided for every four LED display modules. The connection hub may have at least one internal power supply that converts a higher input voltage to a lower output voltage; the lower output voltage may then be provided to each of the LED display modules connected to the connection hub. The connection hub may have four ports, each of which can relay data from an input on one port to an output on the other ports. The same ports may also deliver power to the four connected LED display modules. The connection hub may also include one or more high voltage (A/C) power ports that receive power from a power source, such as a breaker panel.

In accordance with embodiments of the present disclosure, an interconnection network is provided, the interconnection network may provide multiple data and power routes through LED display modules, LED display module PCBs, and connection hubs.

In accordance with embodiments of the present disclosure, firmware that runs on the LED display modules and connection hubs is provided, the firmware may be responsible for relaying data packets based on routing information included in data packet headers.

In accordance with embodiments of the present disclosure, display control software is provided. The display control software may define routes and send data packets to each of the LED display modules. Such display control software may request confirmation from the LED display modules indicating that the LED display modules have received the data packets. Any packets that do not reach their destinations are rerouted along alternate paths so that a single LED display module, connection hub, or cable malfunction or failure does not inhibit the transmission of data packets to components downstream in the initial route. Furthermore, the display control software may determine that power to one or more LED display modules has been lost. In addition to identifying the affected components, the display control software may also send a command to a neighboring LED display module (e.g., an LED display module that is adjacent to the identified LED display module experiencing the power loss) to switch on its normally open internal power pathway so that power is provided to the identified module not receiving power via its default pathway.

In accordance with at least one embodiment of the present disclosure, a display system is provided. The display system may include a plurality of light-emitting diode (LED) display modules, where each LED display module of the plurality of display modules includes a plurality of LEDs and a plurality of connection hubs, and each connection hub of the plurality of connection hubs is configured to provide power to two or more LED display modules of the plurality of LED display modules. The one or more of the LED display modules of the plurality of LED display modules may be configured to selectively route the power provided by a connection hub of the plurality of connection hubs to an LED display module that is adjacent to the one or more LED display modules. Aspects of the above embodiment may further include where the plurality of connection hubs comprises all of the connection hubs associated with the display system. Another aspects of the above embodiment may include where at least one of the LED display modules of the plurality of LED display modules includes first and second connection ports configured to receive power for illuminating one or more of the plurality of LEDs, and at least one switch configured to selectively couple the first connection port to the second connection port. An additional aspect of the above embodiment may include where the first connection port is configured to receive power from at least one power source located in the connection hub, and the second connection port is configured to provide power to a different LED display module. Further still, an additional aspect of the above embodiment may include where the different LED display module is adjacent to the at least one LED display module. An additional aspect of the above embodiment may include where in a first operating state, the second connection port is not configured to provide power to a different LED display module and in a second operating state, the LED display module is configured to provide power to the different LED display module. Further still, an additional aspect of the above embodiment may include where when in the second operating state, the at least one switch electrically couples the first connection port to the second connection port. Further still, the above embodiment may include where at least one connection hub is configured to provide power to two or more LED display modules that are not directly connected to the at least one connection hub. Additionally, the above embodiment may include at least one power source coupled to two or more connection hubs, and at least one display controller coupled to at least one of the two or more connection hubs.

In accordance with at least one embodiment of the present disclosure, a display module is provided. The display module may include a plurality of light-emitting elements, first and second connection ports configured to receive power for illuminating one or more of the plurality of light-emitting elements, and at least one switch configured to selectively couple the first connection port to the second connection port. Aspects of the above embodiment may include where the first connection port is configured to receive power from at least one power source, and the second connection port is configured to provide power to a different display module. Further still, aspects of the above embodiment may include where the second connection port is configured to provide power to the different display module when the at least one switch couples the first connection port to the second connection port. In addition, aspects of the above embodiment may include where the first connection port is configured to receive data from a connection hub power source, and the second connection port is configured to provide data to the different display module. Aspects of the above embodiment may include where the second connection port is not configured to provide power to the different display module when the at least one switch does not couple the first connection port to the second connection port. Additional aspects of the above embodiment may include at least one processor configured to control the at least one switch.

In accordance with at least one embodiment of the present disclosure, a method for rerouting power in a display system including a plurality of display modules is provided. The method may include determining that a first display module in the display system is not receiving power, and selectively coupling power from a second display module to the first display module. Additional aspects of the above embodiment may further include coupling a first connection port of the second display module to a second connection port of the second display module via at least one switch. Further still, additional aspects of the above embodiment may include where the second connection port is electrically coupled to a connection port of the first display module. Moreover, additional aspects of the above embodiment may include causing at least one light-emitting element of the first display module to illuminate. Moreover, the above embodiment and/or additional aspects may be implemented on a processor program product comprising one or more processor-readable storage media having stored thereon processor-executable instructions that are executable by at least one processor of the display system.

The primary advantages of such previously-described system are that such a system provides redundant and/or alternative power distribution without the addition of power supplies. Additionally, by providing redundant and/or alternative power and data pathways, the number of components, connections, and cables can be minimized versus conventional approaches. The simplification increases reliability by reducing the failure points and simplifies installation, maintenance, technician training, and troubleshooting.

Accordingly, it is these and other advantages that will be apparent from the disclosure.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" and/or "computer-readable device" as used herein refers to any tangible storage that participates in providing instructions to a processor for execution. Such a medium/device may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media and/or a computer-readable device include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid-state medium like a memory card, any other memory chip or cartridge, or any other medium from which a computer can read. When the computer-readable media and/or computer-readable device is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

FIG. 3 illustrates additional details of a connection hub in accordance with embodiments of the present disclosure;

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
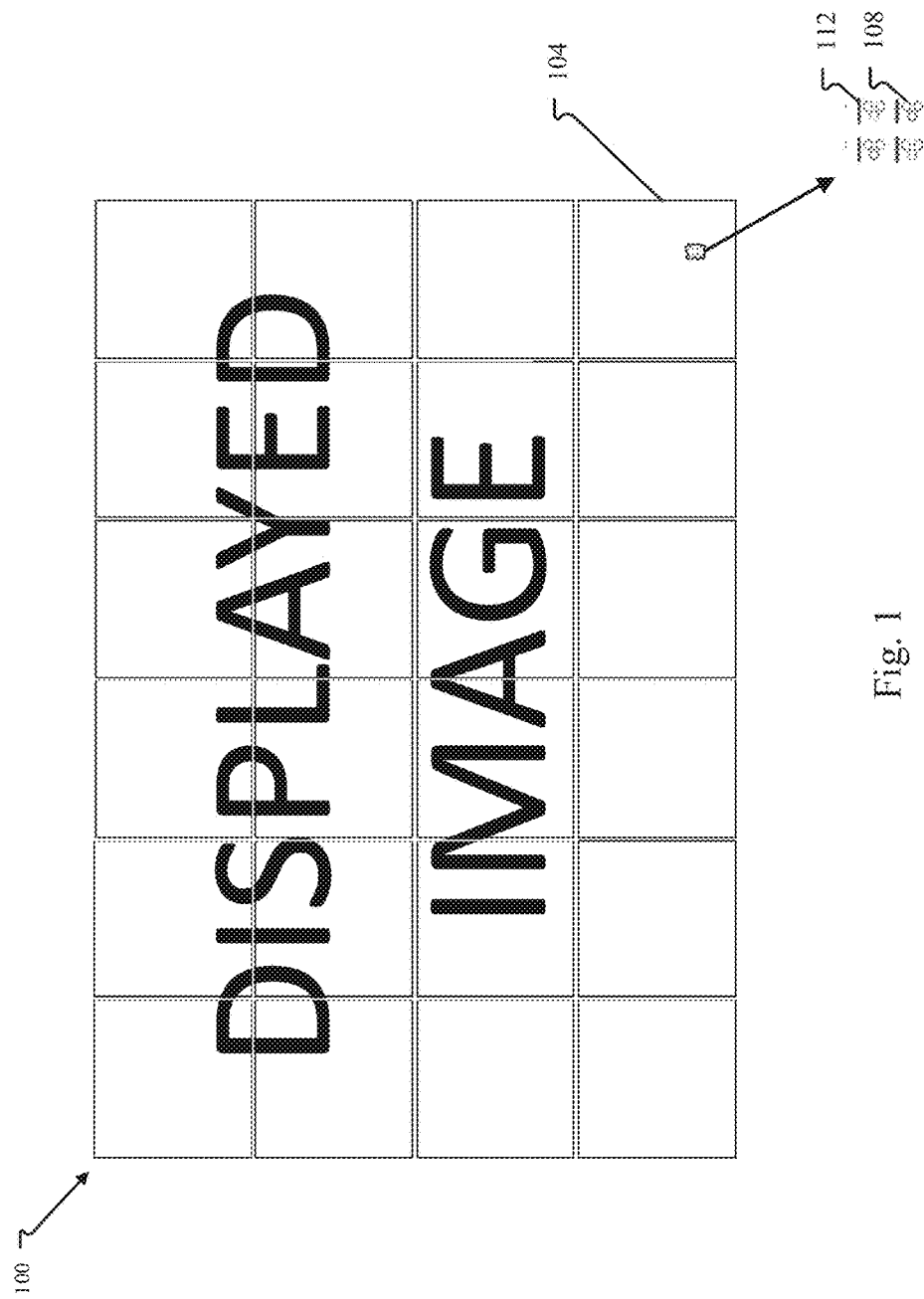
FIG. 1 illustrates a display in accordance with embodiments of the present disclosure.

FIG. 1 generally depicts a display 100 including a plurality of light-emitting diode (LED) display modules 104 in accordance with at least one embodiment of the present disclosure. Each LED display module 104 generally includes an LED housing including a plurality of LEDs 108, a Printed Circuit Board (PCB) assembly, and a plurality of louvers 112. Each of the LED display modules 104 may be configured to output an image, or a portion of an image, as depicted in FIG. 1. Although described as including a plurality of LEDs 108, other sources of illumination are contemplated. That is, incandescent, halogen, fluorescent, Xenon, Tungsten, and Mercury based sources of illumination are contemplated.

Figure 2:
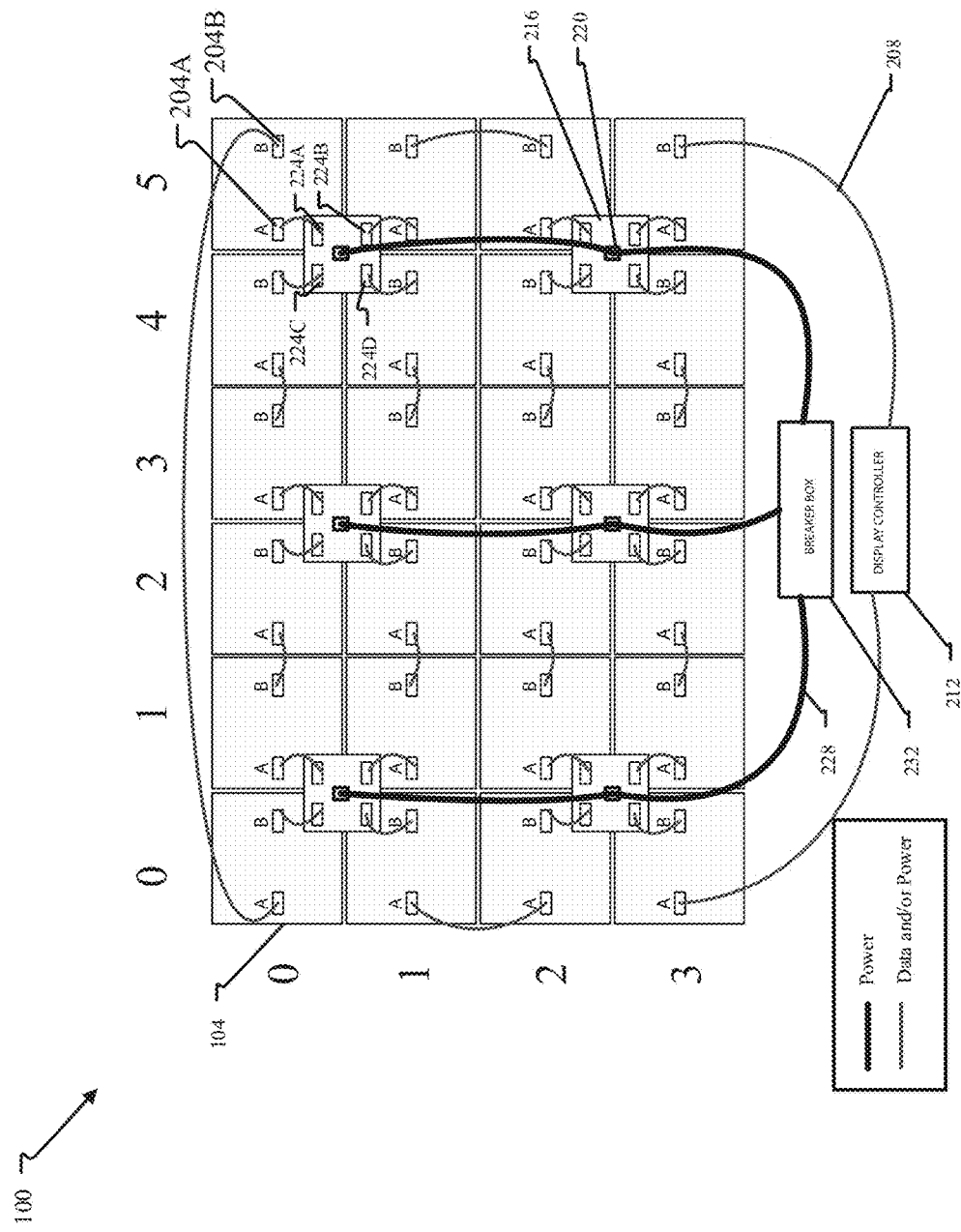
FIG. 2 illustrates one or more components included in the display of FIG. 1 in accordance with embodiments of the present disclosure.

FIG. 2 generally depicts one or more components included in the display 100 and/or the LED display modules 104 in accordance with embodiments of the present disclosure. Each of the LED display modules 104 may include two connector ports 204A and 204B for example, each of which may be capable of relaying data and/or power from connection port to connection port. Although two connections ports are illustrated, one or more of the LED display modules 104 may include more than two connection ports or less than two connection ports. The data may be provided from a display controller 212 that controls or otherwise directs the display of one or more images on the display 100. The data may be distributed amongst the LED display modules 104 via an interconnection network that provides multiple data and power routes through the LED display modules 104, data and power lines 208, one or more connection hubs 216, and/or one or more connection ports (204A-B/224A-D).

In accordance with embodiments of the present disclosure, a connection hub 216 may be provided for every four LED display modules 104. Of course, it should be understood that the connection hub 216 may be provided for more than four LED display modules and/or less than four LED display modules 104. The connection hub 216 includes at least one internal power supply 220 that converts a higher input voltage, such as, but not limited to, 120 volts AC provided from a breaker box 232 via power line 228, to a lower output voltage, such as, but not limited to, 5 volts DC. The lower voltage (4.5 volts DC for example) output power may then be used by the corresponding LED display module 104 for operation. Alternatively, or in addition, the connection hub may include a plurality of power supplies (e.g. FIG. 3 304A-D) such that at least one internal power supply 304 is dedicated to providing power to a single LED display module 104 as a primary power supply. In addition, each power supply 220 and/or 304A-D may be sized or otherwise configured to provide more power than is required for the operation of a single LED display module 104. For example, each power supply 220 and/or 304A-D may be capable of powering two LED display modules 104 at an optimal and/or reduced capacity. As further depicted in FIG. 2, the connection hub 216 generally includes, but is not limited to, four connection ports 224A-D each of which may be configured to relay data and power to a corresponding connection port 204A/204B of an LED display module 104.

Each of the LED display modules 104 and/or the connection hubs 216 may include one more controllers, such as a processor and memory, that includes firmware or other software instructions that relay data packets based on routing information included in data packet headers. Accordingly, a data packet may be provided by the display controller 212, and may be routed to a destination LED display module 104; the route may include one or more data and power lines 208, one or more led modules 104, and one or more connection hubs 216. A route may be well established and not change; alternatively, or in addition, a route may be configured and/or reconfigured in real-time as a data packet travels along the route. Accordingly, if one or more components, such as an LED display module 104, power and data line 208, connection hub 216, and/or a power supply 220 fails to function, a route can be modified such that data and power are supplied to all LED display modules 104.

Figure 4B:
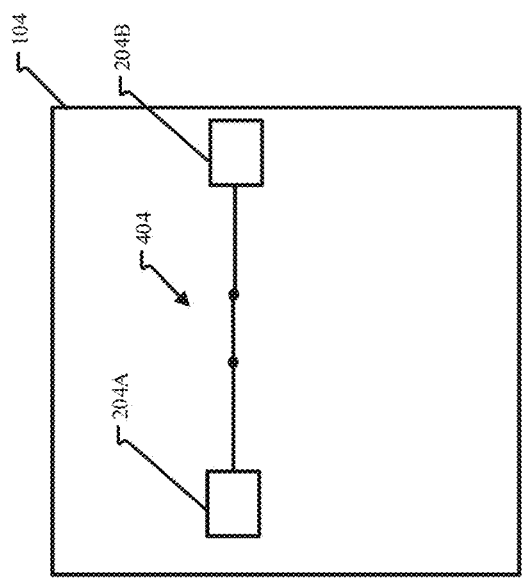
FIGS. 4A-B illustrate additional details of an LED display module in accordance with embodiments of the present disclosure.
Figure 4A:
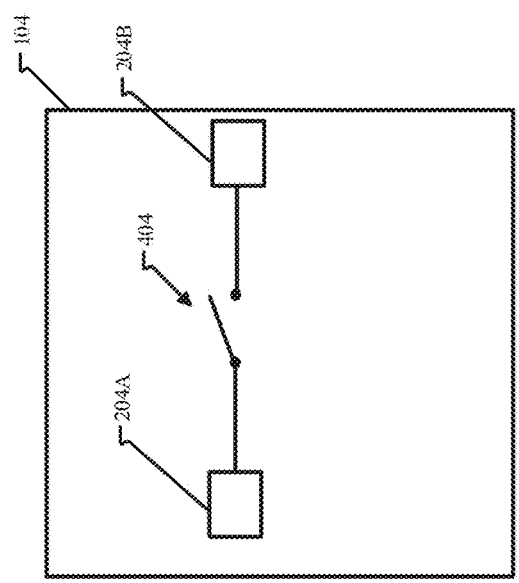
Figure 9:
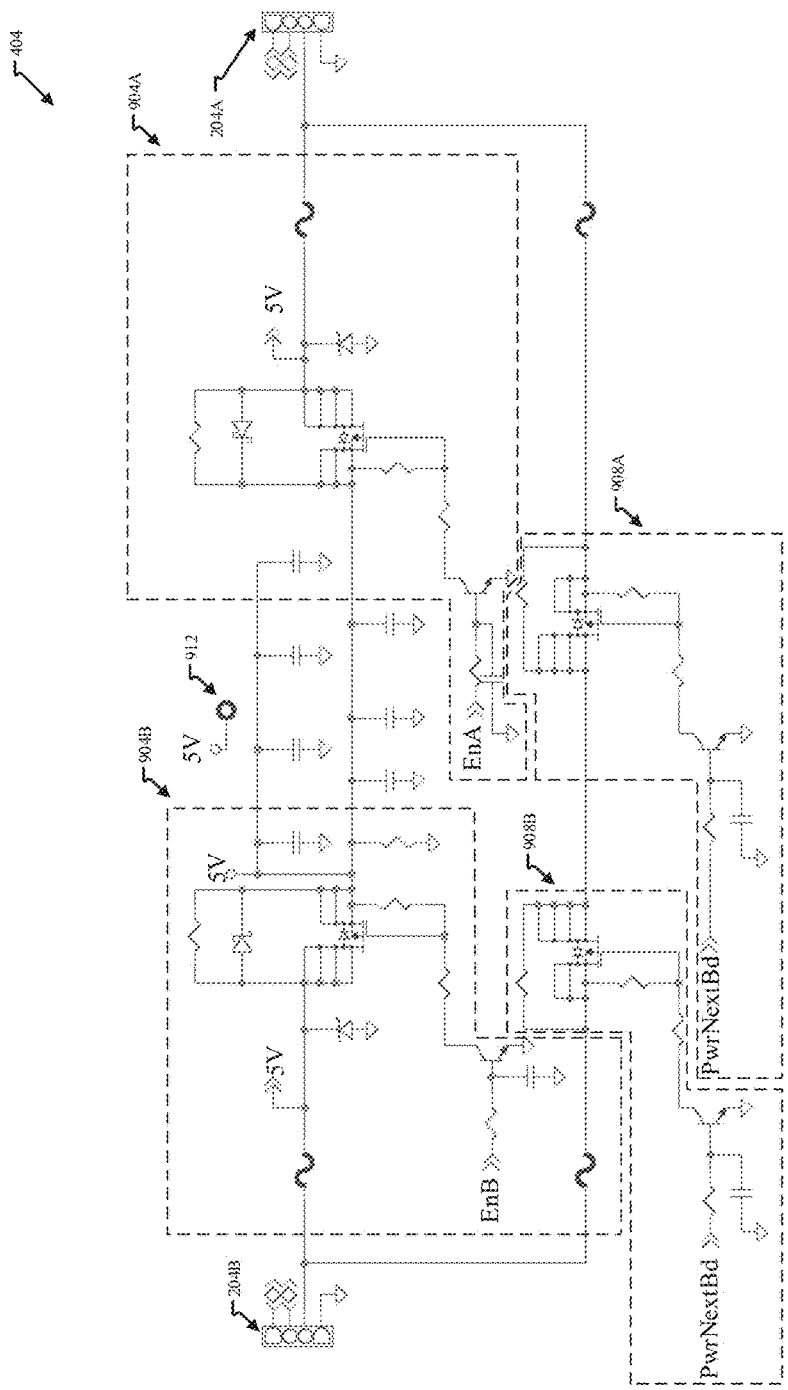
FIG. 9 depicts additional details of a switch in accordance with embodiments of the present disclosure.

In accordance with embodiments of the present disclosure, one or more LED display modules 104 may include at least one switch 404 for connecting a connection port 204A, for example, to connection port 204B, for example. Accordingly, as depicted in FIG. 4A, a switch 404 is in the open position such that the two connection ports 204A-B are not connected to one another. As depicted in FIG. 4B, the switch 404 is closed such that the two connection ports 204A-B are connected to one another. The toggling of the switch, as depicted in FIGS. 4A-B, may be performed when alternative data and/or power is required, as will be described further below. The switch 404 may be implemented as a mechanical, electrical, and/or electromechanical switch. For example, and as will be discussed, FIG. 9 depicts additional details of switch 404 in accordance with embodiments of the present disclosure. Alternatively, or in addition, the switch 404 may be implemented as or otherwise include a relay.

Figure 5:
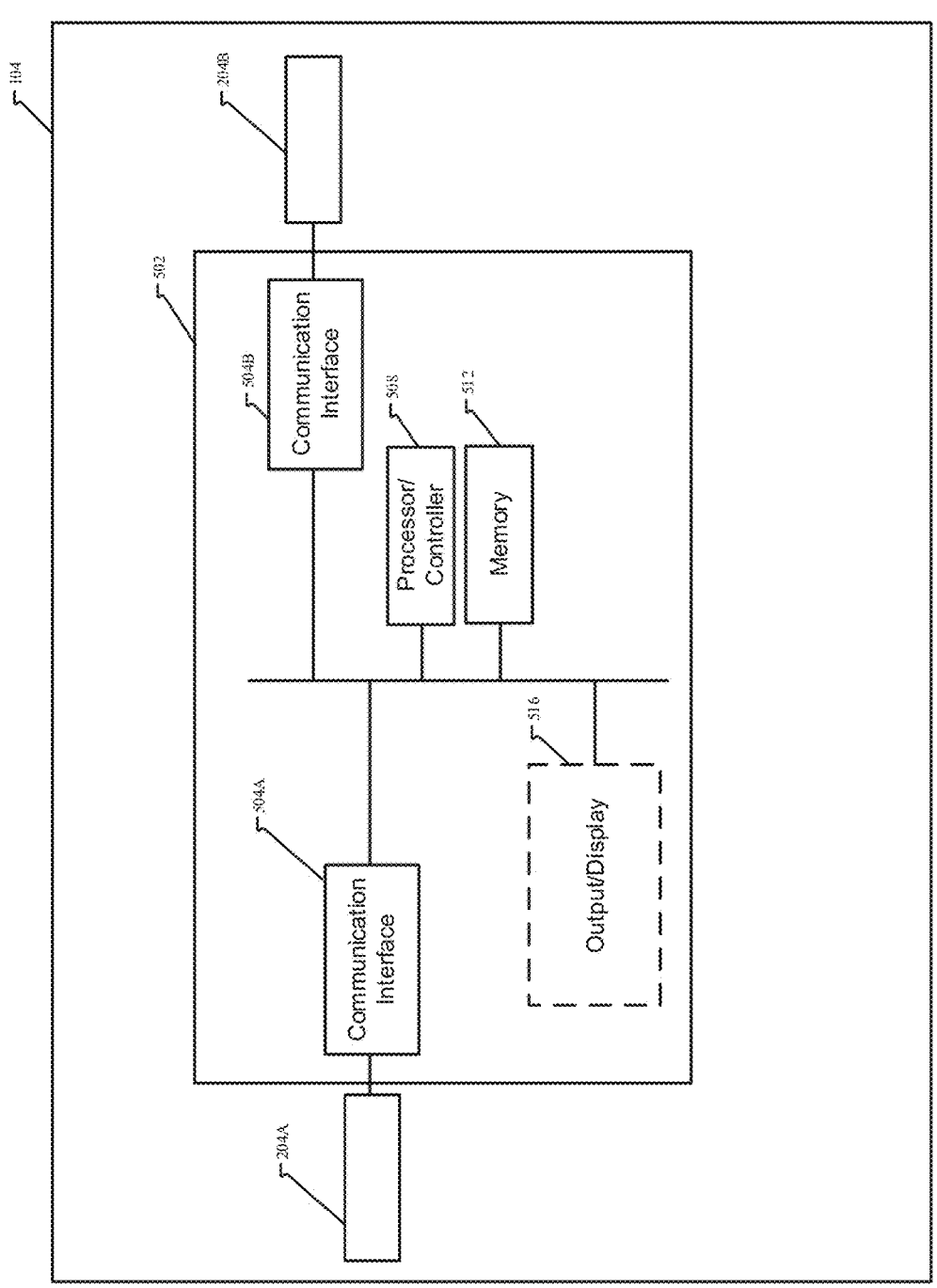
FIG. 5 illustrates additional details of an LED display module in accordance with embodiments of the present disclosure.

FIG. 5 depicts one or more components of the LED display module 104 in accordance with embodiments of the present disclosure. That is, one or more LED display modules 104 may include an LED display module controller 502; the LED display module controller 502 may include communication interfaces 504A-B, a processor/controller 508, and memory 512. Such components may provide data and/or power to a plurality of LEDS included in the output/ display 516. The processor/controller 508 may be implemented as any suitable type of microprocessor or similar type of processing chip, such as any general-purpose programmable processor, digital signal processor (DSP) or controller for executing application programming contained within memory. Alternatively, or in addition, the processor/ controller 508 and memory 512 may be replaced or augmented with an application specific integrated circuit (ASIC), a programmable logic device (PLD), or a field programmable gate array (FPGA).

The memory 512 generally includes software routines facilitating, in operation, pre-determined and/or real-time functionality of the LED display module 104. The memory 512 may be implemented using various types of electronic memory generally including at least one array of non-volatile memory cells (e.g., Erasable Programmable Read Only Memory (EPROM) cells or flash memory cells, etc.). The memory 512 may also include at least one array of Dynamic Random Access Memory (DRAM) cells. The content of the DRAM cells may be pre-programmed and write-protected thereafter, whereas other portions of the memory may be selectively modified or erased. The memory 512 may be used for either permanent data storage or temporary data storage.

The communication interfaces 504A-B may be coupled to or otherwise connected to respective LED display module connector ports 204A-B. Accordingly, the communication interfaces 504A-B may provide/receive information from the LED display module connector ports 204A-B. For example, data from the display controller 212 may be provided to the communication interfaces 504A and/or 504B via one or more of the LED display module connector ports 204A-B. As another example, data from the display controller 212 may be provided to the communication interface 504A via connector port 204A and may be relayed or otherwise provided to another LED display module via connector port 204B. Such communication interfaces 504A-B may support various forms of communication, including, but not limited to, serial communications between one or more ports 204A-B and one or more processors 508 and/or memory 512 for example. Further, each of the ports 204A-B may include two wires constituting a communication pathway for data and two wires constituting a pathway for power (e.g., positive and negative voltage).

Figure 6:
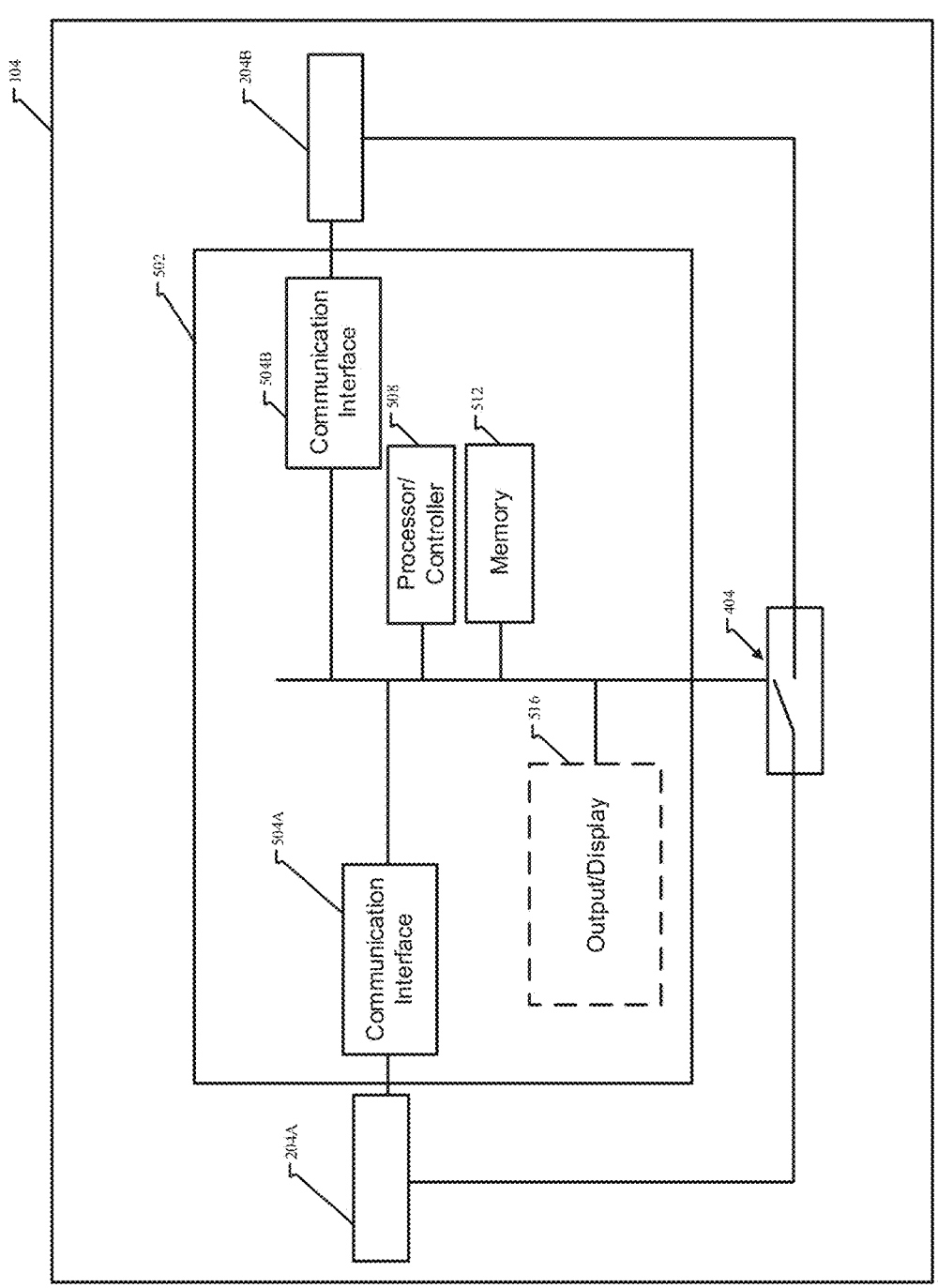
FIG. 6 illustrates additional details of an LED display module in accordance with embodiments of the present disclosure.

As depicted in FIG. 6, power may be provided to the LED display module 104 via one or more of the connector ports 204A-B. That is, and as previously described, in some instances, power (e.g., low voltage power—5 VDC) may be provided from one or more connection hub ports 224A-D of the connection hub 216 via one or more data and power connections 208 to one or more of the connector ports 204A-B. The switch 404 may cause the power to be relayed through the led module 104; accordingly, power from the connection port 204A may be provided to the connection port 204B. Alternatively, or in addition, power from the connection port 204B may be provided to the connection port 204A.

Figure 7:
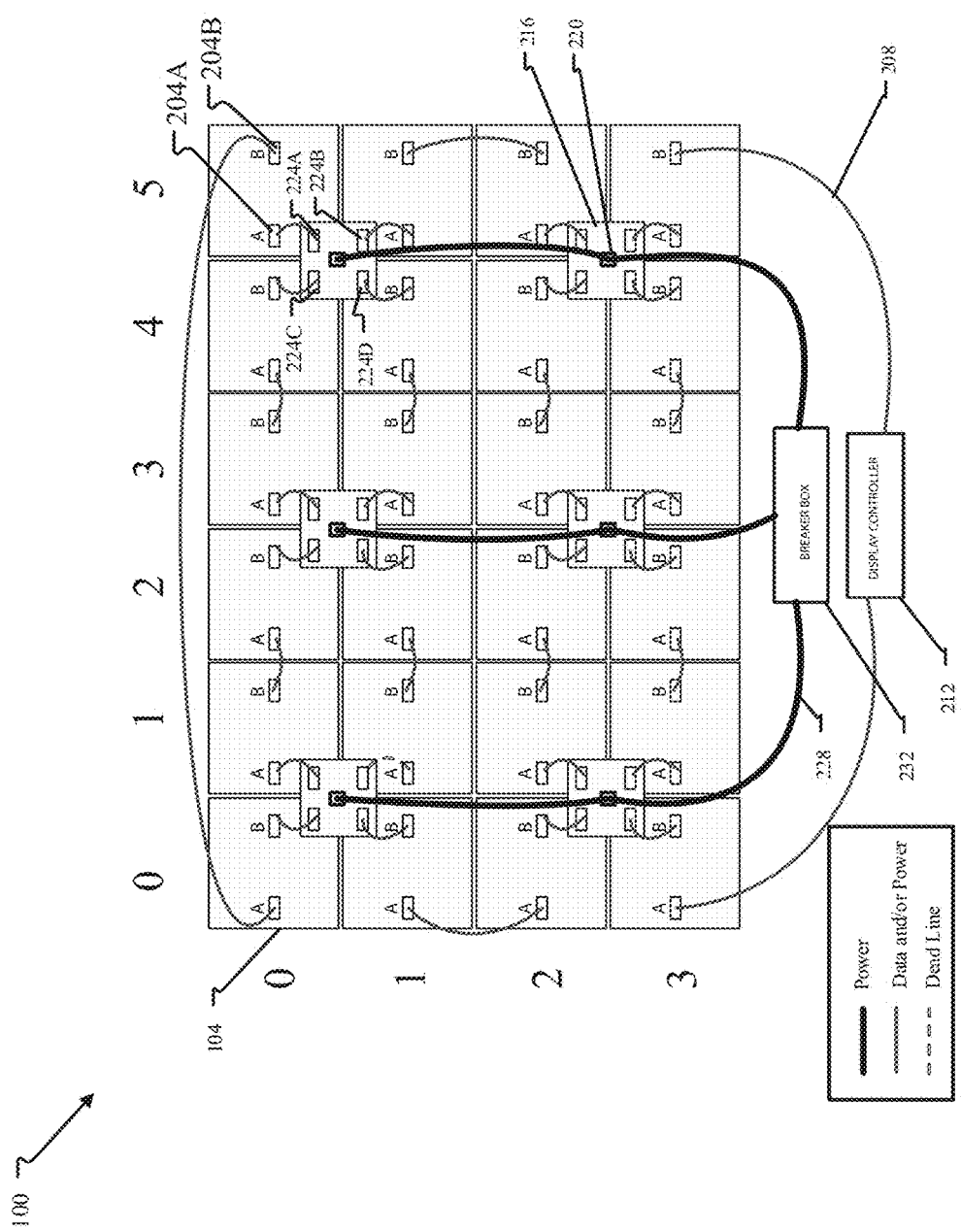
FIG. 7 illustrates a first power and data routing scheme in accordance with embodiments of the present disclosure.

FIG. 7 depicts a display 100 with an alternative data route for the LED display module 104 located in row 1 column 2. A typical routing scheme may route data from the display controller 212, to a first connection port of an LED display module 104 (row 3, col 0). The data may then flow to the second port of the LED display module 104 row 3, col 0 to the connection hub serving the LED display modules in row 3, col 0, row 3, col 1, row 2, col 0, and row 2 col 1. The data may then be routed to a first connection port in the LED display module in row 2 col 0. From the first connection port in the LED display module in row 2 col 0, the data may be routed to the second connection port of the LED display module in row 2 col 0 and then to a first connection port of the LED display module in row 1 col 0. From the second connection port of the LED display module in row 1 col 0, the data may flow to the connection hub serving the LED display modules in row 0, col 0, row 1, col 0, row 0, col 1, and row 1 col 1.

In instances where data is not received via a typical or intended routing scheme as described above, data may be routed along a different or alternative data route. For example, if the LED display module located in row 1, col 1 has a nonfunctioning port, a loose connection, or a fault in a connection hub (as depicted by the dead line 704), an alternative data route may be utilized. That is, data may be routed from the display controller 212, to a first connection port of an LED display module 104 in row 3, col 5. The data may then flow to the second port of the LED display module 104 row 3, col 5 to the connection hub serving the LED display modules in row 3, col 4, row 3, col 5, row 2, col 4, and row 2 col 5. The data may then be routed to a first connection port in the LED display module in row 2 col 5. From the first connection port in the LED display module in row 2 col 5, the data may be routed to the second connection port of the LED display module in row 2 col 5 and then to a first connection port of the LED display module in row 1 col 5. Accordingly, the data may then flow to the connection hub serving the LED display modules in row 1, col 4, row 1, col 5, row 0, col 4, and row 0 col 5. The data may then be routed to a first connection port in the LED display module in row 0 col 4. From the first connection port in the LED display module in row 0 col 4, the data may be routed to the second connection port of the LED display module in row 0 col 4 and then to a first connection port of the LED display module in row 0 col 3. From the second connection port of the LED display module in row 0 col 3, the data may flow to the connection hub serving the LED display modules in row 1, col 2, row 1, col 3, row 0, col 2, and row 0 col 3. The data may then flow from a first port of the LED display module in row 1 col 2 to a second port of the LED display module in row 1 col 2 and finally to the LED display module located in row 1 col 1.

Figure 8:
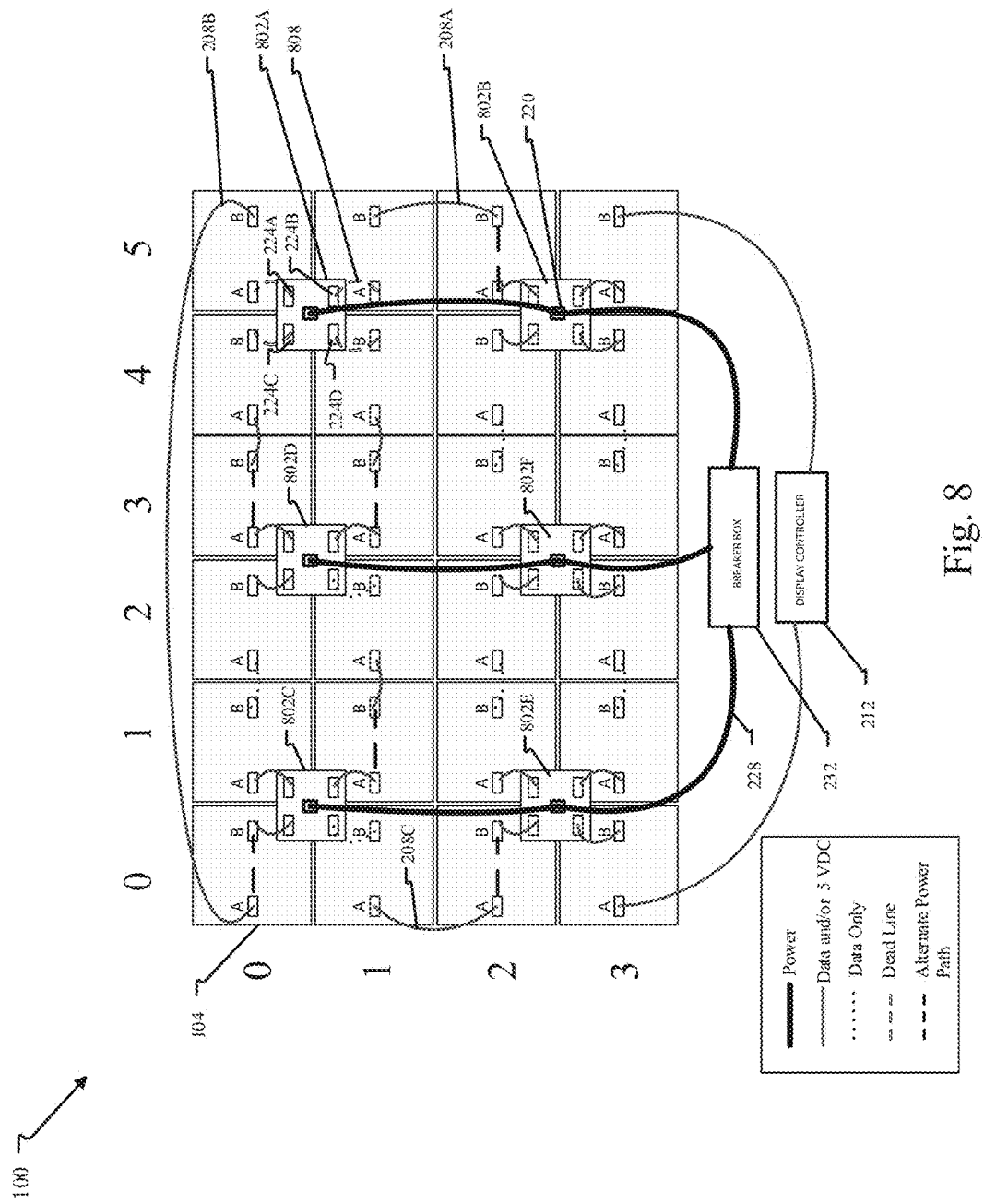
FIG. 8 illustrates a second power and data routing scheme in accordance with embodiments of the present disclosure.

FIG. 8 depicts a display 100 with an alternative power (and data in some instances) route for the LED display modules 104 located in row 0 col 4, row 0 col 5, row 1 col 4, and row 1 col 5. That is, a typical or intended routing scheme may route power from the connection hub 802A to each of the LED display module 104 located in row 0 col 4, row 0 col 5, row 1 col 4, and row 1 col 5. However, if an issue arises whereby the connection hub 802A is in a non-working condition, power (and data in some instances) to the LED display modules 104 located in row 0 col 4, row 0 col 5, row 1 col 4, and row 1 col 5 may be provided by other connection hubs 802B-802D via other LED display modules 104.

For example, the connection hub 802C may provide power to the LED display module located in row 0 col 5. Accordingly, the switch 404 in the LED display module 104 located in row 0 col 0 may be closed such that low voltage output power provided from connection hub 802C can be routed from the LED display module located in row 0 col 0 to the LED display module located in row 0 col 5 via an existing data and low voltage power connection 208B. Further, the switch 404 in the LED display module 104 located in row 2 col 5 may be closed such that low voltage output power provided from connection hub 802B can be routed to the LED display module located in row 1 col 5 via an existing data and low voltage power connection 208A.

Because connection hubs 802 may be limited to providing low voltage output power to a maximum number of LED display modules 104 (for example five LED display modules), a connection hub 802, such as connection hub 802E, may provide power to LED display modules 104 not normally supplied by such connection hub 802E. For example, the connection hub 802D may normally provide power to LED display modules 104 located in row 0 col 2, row 0 col 3, row 1 col 2, and row 1 col 3. In some instances, the connection hub 802D may provide power to the LED display modules 104 located in row 0 col 4 and row 1 col 4. Accordingly, the LED display module located in row 1 col 2 may receive power from the connection hub 802C. Similarly, because connection hub 802C is providing power to the LED display modules located in row 0 col 5 and row 1 col 2, the LED display module 104 located in row 1 col 0 may receive power form the connection hub 802E via an existing data and power connection 208C for example. Accordingly, when a fault occurs, an optimal power routing algorithm may be utilized to ensure that each connection hub 802 supplies five or less LED display modules 104 with power via one or more switches 404 located within the corresponding LED display module 104. Of course, it should be understood that each connection hub 802 may provide power to more than five led modules 104 and/or that the amount of LED display modules 104 served by each connection hub 802 may be based on a real-time power usage amount.

For example, a blue pixel in an image may be illuminated with a single blue LED; however, a white pixel in an image may be illuminated with blue, green, and red LEDs, requiring a greater amount of power than a single blue LED. Accordingly, a single connection hub may be sized to provide power to six LED display modules 104 at an optimum brightness when a blue image is displayed, but the same connection hub may only be able to provide power to five LED display modules 104 at an optimum brightness when a white image is displayed. Thus, the power routing (and data in some instances) may be based on the color, brightness, and real-time power usage associated with a displayed image.

Moreover, each connection hub 802A-F for example may be capable of independently switching on and off each of the power outputs corresponding to the independent power supplies 304. Referring again to FIG. 8, connection hubs 802C and 802D are each supplying power to the LED display modules served by connection hub 802A. Accordingly, each of the connection hubs 802C and 802D may switch off a power output (e.g., power output supplying row 1 col 0 and row 1 col 2) to avoid supplying more than five LED display modules with power for example.

In accordance with embodiments of the present disclosure, connection hubs 802 that include four independent power supplies 304A-D for example may route power in a different manner. That is, because each power supply 304 may include the ability to provide power to two or more LED display modules, the switch 404 in each of the LED display modules located at row 0 col 0, row 0, col 3, row 1, col 3, and row 2, col 5 may be closed such that the LED display modules usually served by the connection hub 802A may now be served power by connection hubs 802C, 802D, and 802B and existing power connections 208B and 208A. In instances where the connection hubs include four independent power supplies, the ability to switch off power ports corresponding to each of the independent power supplies may not be needed.

FIG. 9 depicts additional details of a switch 404 in accordance with embodiments of the present disclosure. That is, the switch 404 may be an electrical switch and rely on one or more transistors to switch on and off power provided to one or more connection ports 204A-B through the LED display module 104. Accordingly, FIG. 9 depicts at least one configuration where switches 904A, 904B, 908A, and 908B are utilized to provide power to not only a connection port 208A or 208B, but also to other components, such as the processor/controller 508 and other components of the LED display module controller 502 via connection 912. As one example, power, such as 5 volts, may be provided to the connection port 204A. The power may flow across the Zener diode located in switch 904A and provide power having a voltage corresponding to the supply voltage less the voltage drop across the Zener diode to connection 912. Such power may then turn on the processor/controller 508. An enable signal, such as EnA, may be provided to the switch 904A from the processor/controller 508 thereby providing a full supply voltage received from the connection port 208A without the voltage drop imparted by the Zener diode to the connection 912. Similarly, power from connection port 208A may be provided to connection port 208B via one or more the switches 908A-B and a PwrNextBd enable signal provided by the processor/controller 508.

As another example, power, such as 5 volts, may be provided to the connection port 204B. The power may flow across the Zener diode located in switch 904B and provide power having a voltage corresponding to the supply voltage less the voltage drop across the Zener diode to connection 912. Such power may then turn on the processor/controller 508. An enable signal, such as EnB, may be provided to the switch 904B from the processor/controller 508 thereby providing a full supply voltage received from the connection port 208B without the voltage drop imparted by the Zener diode to the connection 912. Similarly, power from connection port 208B may be provided to connection port 208A via one or more the switches 908A-B and a PwrNextBd enable signal provided by the processor/controller 508.

Figure 10:
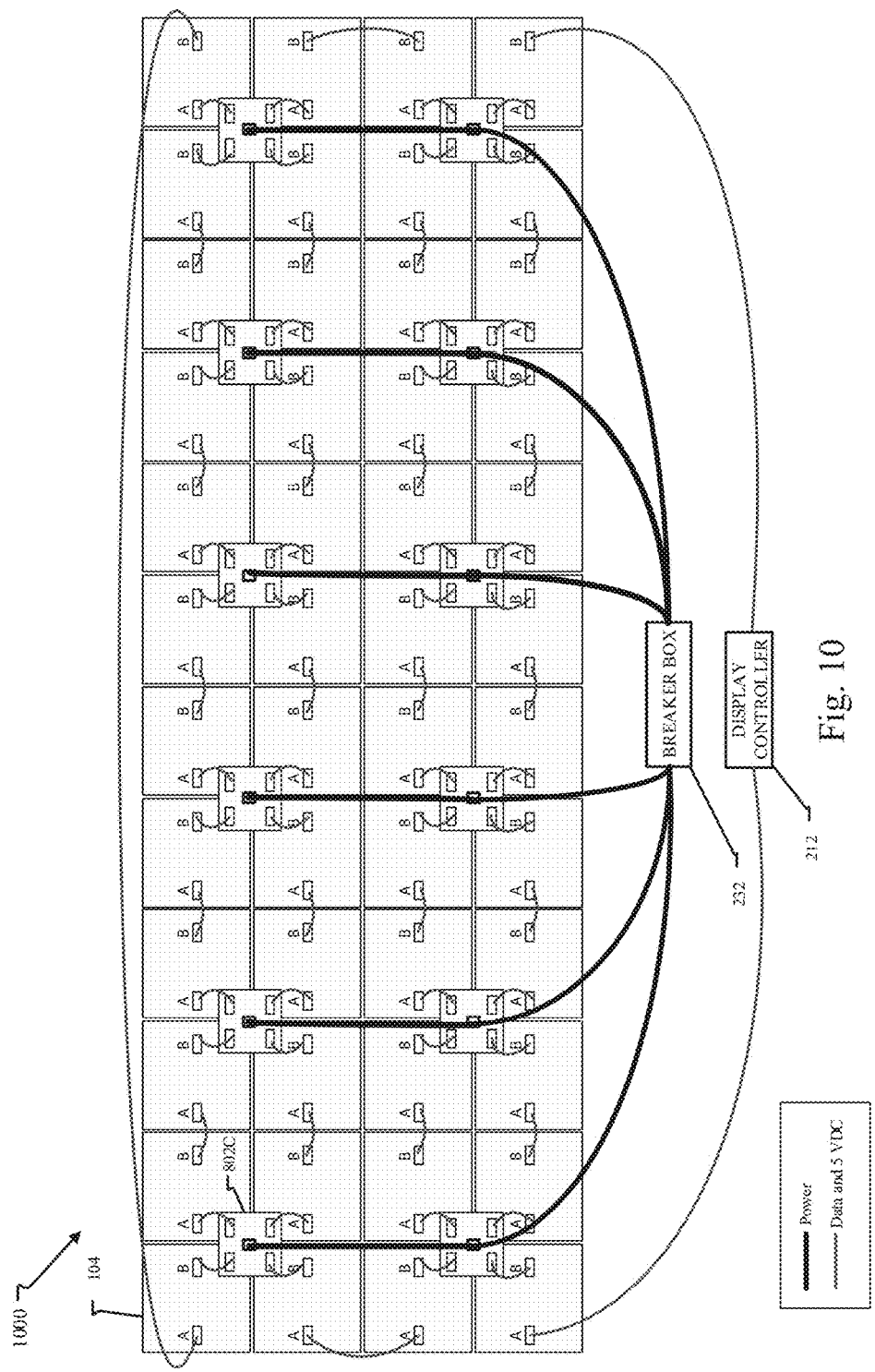
FIG. 10 depicts a second display configuration in accordance with embodiments of the present disclosure.
Figure 11:
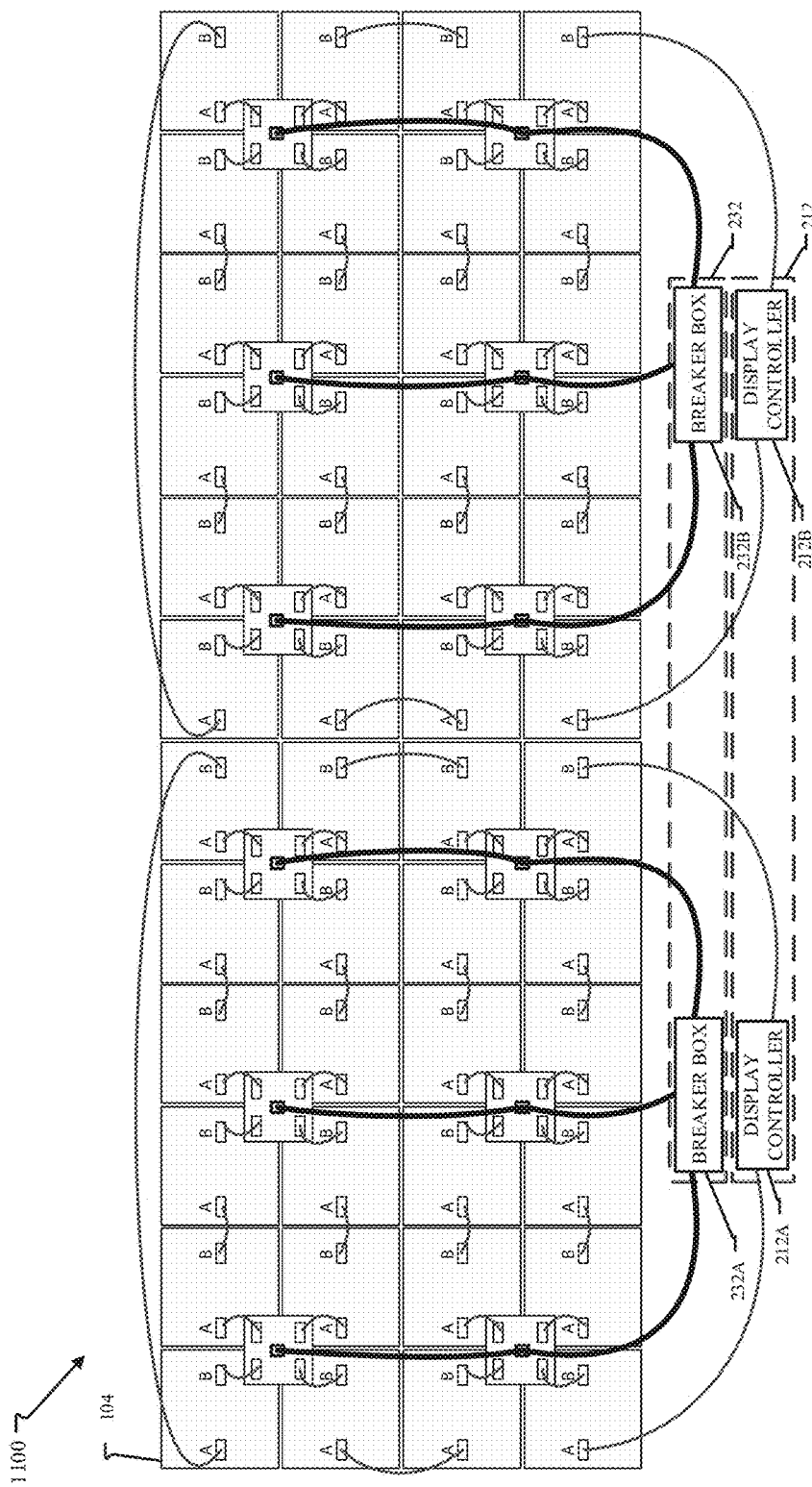
FIG. 11 depicts a third display configuration in accordance with embodiments of the present disclosure.

FIG. 10 depicts an example of a display 1000 in accordance with at least one embodiment of the present disclosure. The display 1000 is similar to display 100 except that the breaker box 232 and display controller 212 are connected to forty-eight LED display modules 104, instead of twenty-four LED display modules 104 as depicted in FIG. 2. As such, a single breaker box and a single display controller may control each of the LED display modules 104 depicted in FIG. 10. Of course, it should be noted that a display may include more or less LED display modules 104, breaker boxes 232 and/or Display controllers 212. For example, FIG. 11 depicts an example of a display 1100 in accordance with at least one embodiment of the present disclosure. Similar to display 1000, the display 1100 includes forty-eight LED display modules 104; however, two breaker boxes 232A-B and two display controllers 212A-B are included. Accordingly, the display 1100 may be portioned into a plurality of regions, where each region includes a dedicated breaker box 232A-B and/or a dedicated display controller 212A-B. Alternatively, or in addition, and similar to display 1000, the display 1100 includes forty-eight LED display modules 104, one breaker box 232, and/or one display controller 212. Accordingly, the display 1100 may be portioned into a plurality of regions, where two or more regions are powered by a single breaker box 232 and/or receive data from a single display controller 212. Although such portions are depicted in a side-by-side configuration, it should be appreciated that such portions may be arranged in any manner. For example, such portions may be arranged in a top and bottom configuration and/or may include another portion not powered by the breaker box 232

Figure 12A:
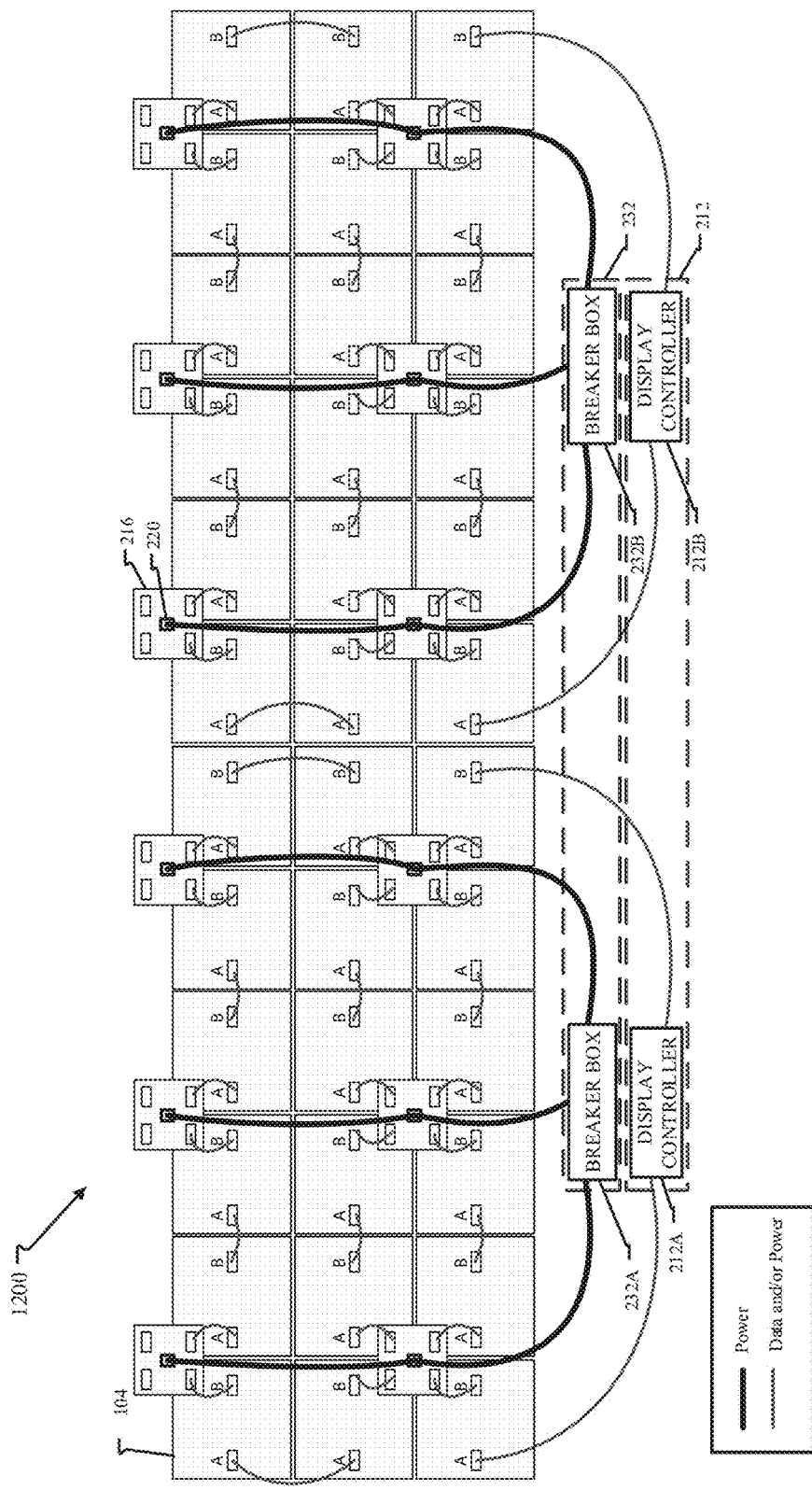
FIG. 12A-B depicts a fourth display configuration in accordance with embodiments of the present disclosure.
Figure 12B:
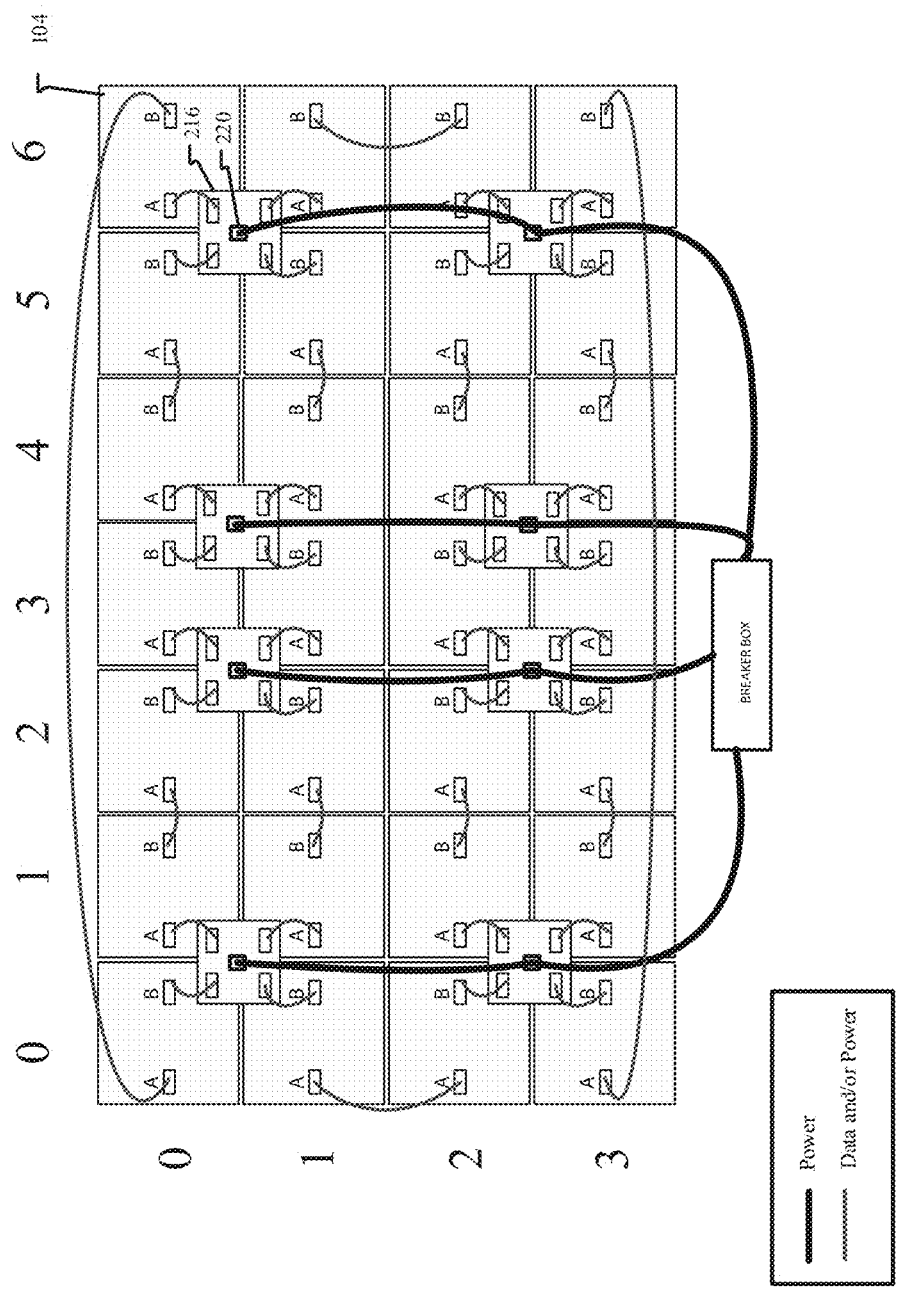

As depicted in FIG. 12A, the display 1200 may comprise an odd number of rows. Similarly, and as depicted in FIG. 12B, the display 1200 may comprise an odd number of columns. That is, the display 1200 may be portioned into a plurality of regions, where each region includes a dedicated breaker box 232A-B and/or a dedicated display controller 212A-B, where each region includes an odd number of columns and/or an odd number of rows. Thus, as depicted in FIGS. 12A and 12B, the connection hubs may initially supply power to less than four LED display modules. Alternatively, or in addition, during a fault condition, and as previously mentioned, power and/or data may be routed such that one or more connection hubs provides power to more LED display modules than the one or more connection hubs do during a non-fault condition.

Figure 13:
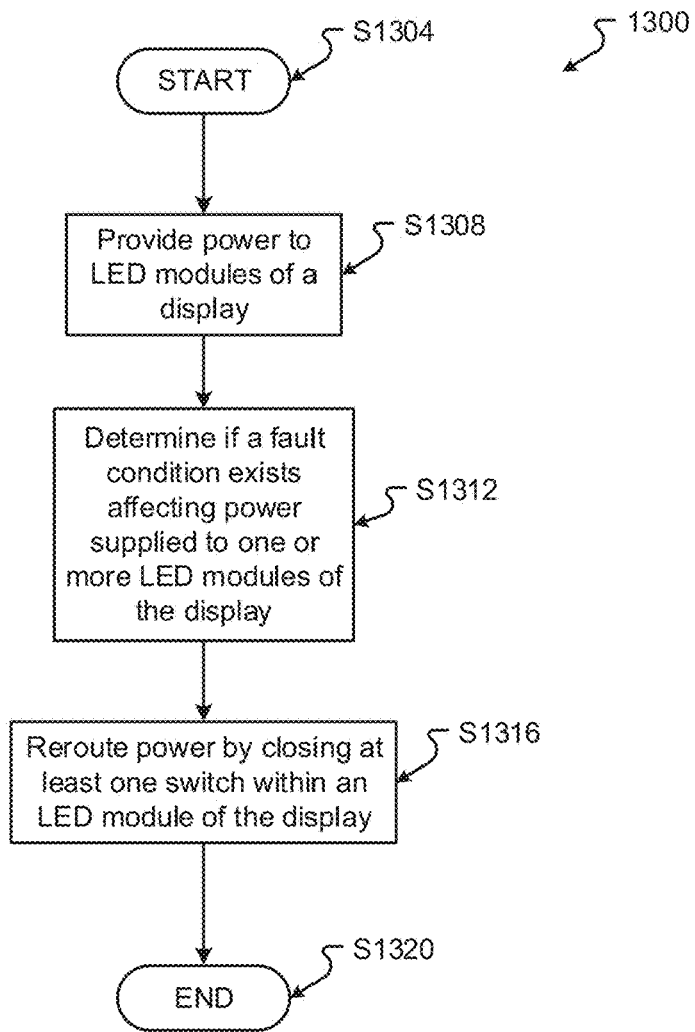
FIG. 13 depicts a first flow chart in accordance with embodiments of the present disclosure.

Referring now to FIG. 13, a method 1300 of routing power through one or more LED display modules is provided. Method 1300 is in embodiments, performed by a device, such as one or more components of the display 100. More specifically, one or more hardware and software components may be involved in performing method 1300. In one embodiment, one or more of the previously described devices perform one or more of the steps of method 1300. On or more portions of the method 1300 may be executed as a set of computer-executable instructions encoded or stored on a computer-readable medium and executed by a processor/controller, such as the processor/controller 508 and/or a processor controller in the breaker box and/or the display controller. Hereinafter, the method 1300 shall be explained with reference to systems, components, modules, software, etc. described with FIGS. 1-12B.

Method 1300 may continuously flow in a loop, flow according to a timed event, or flow according to a change in an operating or status parameter. Method 1300 is initiated at step S1304 where a display, such as display 100, is configured to display an image. Accordingly, power may be provided to one or more LED display modules of the display at step S1308. That is, and as previously discussed, a source of power, originating from a breaker box 232 for example, may be provided to one or more connection hubs 216 whereby power from the breaker box 232 may be converted into a power for use with one or more of the LED display modules 104. For example, the breaker box may provide an alternative current (AC) voltage that is converted into a direct current voltage (DC). The one or more internal power supply(s) 220 may then be coupled to one or more LED display modules 104 such that the one or more LED display modules receive power of the appropriate voltage. During a no-fault condition, each of the connection hubs 216 and power supplies 220 function as intended; that is, each of the connection hubs 216 together with the power supply 220 provide power to a connector port of one or more LED display modules. In addition, and during a no-fault condition, one or more switches 104 coupling two connection ports 204 of the LED display module 104 are in the open state. That is, power does not flow from one connection port 204A to another connection port 204B of the same LED display module 104 for example.

At step S1312, it may be determined that a fault condition exists which affects power being supplied to one or more LED display modules 104 in one or more row and/or column. For example, a loose connection between the distribution hub 216 and the breaker box 232, LED display module 104, and/or power supply 220 may exist. In other instances, a power supply 220 may cease to function either correctly or at all. For example, a fuse may be blown and/or a circuit breaker may be tripped. In some instances, the fault condition may be detected by the display controller 212, detected by a processor/controller 508, detected by one or more components, such as an ammeter, in the breaker box 232, detected by an ammeter located at one or more LED display modules 104, detected by a voltage detection means, such as a voltmeter, at one or more LED display modules 104, detected by a lack of communication response from the processor/controller 508, detected based on a failed communication pathway between one or more LED display modules and/or detected based on a projected total power usage amount for the display vs. an actual power usage amount for the display 100. Of course, other methods of detection for detecting that power is not reaching one or more LED display modules are contemplated herein.

Thus, at step S1316, power may be rerouted through at least one LED display module 104 by activating or otherwise closing the circuit between the connection port 204A and 204B such that power may flow from one connection port to the other connection port. The LED display module that includes the activated or otherwise closed switch 404 (such as depicted in FIG. 4B, will most likely be next to an LED display module experiencing the loss of power. In some instances, the switch 404 in the affected LED display module as well as the adjacent LED display module will be closed such that power can flow from the source LED display module, through a first affected LED display module, and to another LED display module. The another LED display module may be an LED display module affected by the loss of power from the fault condition; alternatively, or in addition, the another LED display module may be an LED display module not affected by the loss of power from the fault-condition. Method 1300 may end at step S1320.

Figure 14:
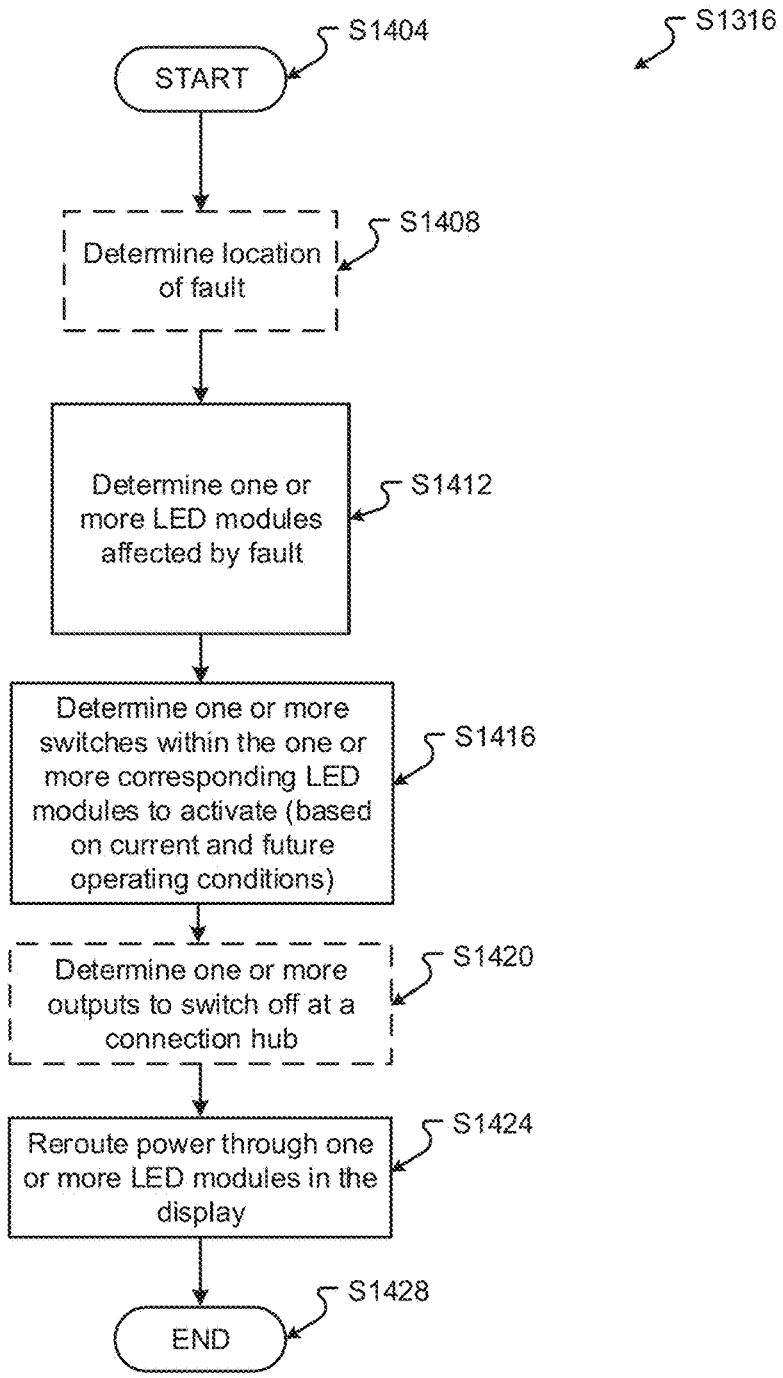
FIG. 14 depicts a second flow chart in accordance with embodiments of the present disclosure.

Referring now to FIG. 14, additional details of the step S1316 are provided in the method 1400. Method 1400 is in embodiments, performed by a device, such as one or more components of the display 100. More specifically, one or more hardware and software components may be involved in performing method 1400. In one embodiment, one or more of the previously described devices perform one or more of the steps of method 1400. On or more portions of the method 1400 may be executed as a set of computer-executable instructions encoded or stored on a computer-readable medium and executed by a processor/controller, such as the processor/controller 508 and/or a processor controller in the breaker box and/or the display controller. Hereinafter, the method 1400 shall be explained with reference to systems, components, modules, software, etc. described with FIGS. 1-13.

Method 1400 may continuously flow in a loop, flow according to a timed event, or flow according to a change in an operating or status parameter. Method 1400 may be initiated at step S1404 where a fault condition may be detected as previously mentioned with respect to FIG. 13. Thus, at step S1408, a location of the fault may be determined. For example, the fault location may be in a loose connection, power supply 220/304, distribution hub 216, breaker box 232 and/or a wire between the breaker box and distribution hub, and/or a wire between the distribution hub and the LED display module. Thus, based on the fault location, the LED display modules affected by the fault condition may be determined. For example, if a connection hub 216 serving LED display modules in row 0 col 0, row 1 col 0, row 0 col 1, and row 1 col 1 (FIG. 2) is deficient or otherwise in a non-working condition, LED display modules in row 0 col 0, row 1 col 0, row 0 col 1, and row 1 col 1 may be affected. Accordingly, power may be rerouted from other connection hubs of the display 100 to provide power to the LED display modules in row 0 col 0, row 1 col 0, row 0 col 1, and row 1 col 1. Alternatively, or in addition, the one or more LED display modules affected by the fault may be determined in that the affected LED display module may be in a non-working condition. Accordingly, step S1408 may be an optional step in that the exact fault location may not be known or provided. In some instance, a single LED display module may be affected when a fault condition exists at a connection hub.

At step S1416, a path to reroute power may be determined such that the affected LED display modules are provided power. In some instances, an adjacent LED display module may activate a switch 404 such that the connection ports 204A and 204B are coupled together and power flows from one connection port to another. In other instances, and depending on the fault and possibly the fault location, multiple switches 404 in different LED display modules may be closed in order to reroute power from one connection hub to one or more LED display modules not usually or typically served by the connection hub and/or power supply. In some instances, a power rerouting algorithm may be employed such that each power supply is not overloaded or otherwise providing too many LED display modules with power. In some instances, each power supply and/or connection hub may provide power to a maximum of five LED display modules. In other instances, and depending on an amount of power to be provided (e.g. current) based on current operating conditions (e.g., brightness and/or color to be displayed), a power source and/or connection hub may provide power to more than five LED display modules. In some instance, at step S1420, an output of one or more power supplies may need to be switched off such that the power supply, and/or connection hub, does not provide power to too many LED display modules, as discussed with regard to FIG. 11. At step S1424, once a route and/or a portion of a power route as been determined, the power may be routed through the appropriate LED display modules. Method 1400 then ends at step S1428.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this disclosure, with each claim standing on its own as a separate preferred embodiment of the disclosure.

Moreover, though this disclosure has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A display system comprising:
a plurality of light-emitting diode (LED) display modules, each LED display module of the plurality of LED display modules including a plurality of LEDs, wherein at least one of the LED display modules of the plurality of LED display modules includes a power connection port and a bidirectional power connection port configured to receive power for illuminating one or more of the plurality of LEDs, and wherein the at least one of the LED display modules of the plurality of LED display modules includes at least one switch configured to selectively couple power received at the power connection port to the bidirectional power connection port; and
a plurality of connection hubs, each connection hub of the plurality of connection hubs being configured to provide power to two or more LED display modules of the plurality of LED display modules,
wherein in a first operating state, the bidirectional power connection port does not provide power to a different LED display module, and in a second operating state, the at least one switch couples the power received at the power connection port to the bidirectional power connection port such that the at least one LED display module is configured to route the power provided by a connection hub of the plurality of connection hubs to a bidirectional power connection port of another LED display module that is adjacent to the one or more LED display modules.

2. The display system of claim 1, wherein the plurality of connection hubs comprises all of the connection hubs associated with the display system.

3. The display system of claim 1, wherein the different LED display module is adjacent to the at least one LED display module.

4. The display system of claim 1, wherein in the second operating state, the at least one switch electrically couples the power connection port to the bidirectional power connection port.

5. The display system of claim 1, wherein at least one connection hub is configured to provide power to two or more LED display modules that are not directly connected to the at least one connection hub.

6. The display system of claim 1, further comprising:
at least one power source coupled to two or more connection hubs; and
at least one display controller coupled to at least one of the two or more connection hubs.

7. The display system of claim 1, wherein in the second operating state, the at least one switch is configured to relay power from the power connection port to the bidirectional power connection port of the at least one LED display module.

8. The display system of claim 1, wherein each connection hub of the plurality of connection hubs includes a plurality of power supplies, each power supply of the plurality of power supplies being directly coupled to a single LED display module of the plurality of display modules.

9. A display module comprising:
a plurality of light-emitting elements;
a power connection port and a bidirectional power connection port configured to receive power for illuminating one or more of the plurality of light-emitting elements, wherein the power connection port is configured to receive power from at least one power source and the bidirectional power connection port is configured to provide power to a different display module; and
at least one switch configured to selectively couple the power received at the power connection port to the bidirectional power connection port, wherein the bidirectional power connection port is not configured to provide power to the different display module when the at least one switch does not couple the power received at the power connection port to the bidirectional power connection port.

10. The display module according to claim 9, wherein the bidirectional power connection port is configured to provide power to the different display module when the at least one switch couples the power received at the power connection port to the bidirectional power connection port.

11. The display module according to claim 10, wherein a data connection port is configured to receive data from a connection hub power source, and a second data connection port is configured to provide data to the different display module.

12. The display module according to claim 9, wherein the bidirectional power connection port is configured to provide power to the different display module in response to receiving a command via a data connection port.

13. The display module according to claim 9, further comprising at least one processor configured to control the at least one switch.

14. A method for rerouting power in a display system including a plurality of display modules, the method comprising:
determining that a first display module in the display system is not receiving power; and
in response to receiving a command to selectively couple power from a second display module to the first display module, closing a switch associated with the second display module to change an operating state of the second display module from a first state, where a bidirectional power connection port of the second display module is not configured to provide power to the first display module, to a second state, where the second display module couples power received at a power connection port to the bidirectional power connection port.

15. The method of claim 14, wherein coupling power from the second display module to the first display module includes:
coupling power received at the power connection port of the second display module to a bidirectional power connection port of the second display module via at least one switch.

16. The method of claim 15, wherein the bidirectional power connection port is electrically coupled to a bidirectional power connection port of the first display module.

17. The method of claim 16, further comprising:
causing at least one light-emitting element of the first display module to illuminate.

18. A processor program product comprising one or more processor-readable storage media having stored thereon processor-executable instructions that are executable by at least one processor of the display system to perform the method of claim 14.

* * * * *